US005969596A

United States Patent [19]

Wu

[11] Patent Number: 5,969,596

[45] Date of Patent: Oct. 19, 1999

[54] SECURITY SYSTEM WITH AUTOMATIC DOOR LOCKING/UNLOCKING FUNCTION

[76] Inventor: Jun-Nan Wu, No. 234, Lien Chen Rd., Chung Ho, Taipei Hsien, Taiwan

[21] Appl. No.: 09/085,596

[22] Filed: May 27, 1998

[51] Int. Cl.[6] .......... B60R 25/10; G08C 19/00

[52] U.S. Cl. .......... 340/426; 340/425.5; 340/825.69; 340/825.72

[58] Field of Search .......... 340/426, 425.5, 340/825.69, 825.72

[56] References Cited

U.S. PATENT DOCUMENTS

| | | | |
|---|---|---|---|
| 4,897,630 | 1/1990 | Nykerk | 340/426 |
| 4,922,224 | 5/1990 | Drori et al. | 340/426 |
| 5,049,867 | 9/1991 | Stouffer | 340/426 |
| 5,406,274 | 4/1995 | Lambropoulos et al. | 340/825.69 |

*Primary Examiner*—Donnie L. Crosland

*Attorney, Agent, or Firm*—Dougherty & Troxell

[57] ABSTRACT

A car security alarm system includes a receiver portion incorporated in a car electricity system and in electrical/mechanical connection with associated parts/systems of the car and a transmitter portion to be carried by a driver of the car. The transmitter portion repeatedly emits a predetermined signal including an identification code at predetermined intervals. The receiver portion includes a receiving circuit to receive the signal and an identifying circuit to determine if the identification code is correct and apply a confirmation signal to a central processing unit in case the identification code is correct and the central processing unit generates an instruction to unlock the car door in the situation that the car security alarm system is in activated condition. In the condition that the system is in de-activated condition, if no such identification signal is detected by the receiver portion within a predetermined period, then the central processing unit generates a signal to lock the car door.

3 Claims, 2 Drawing Sheets

SECURITY SYSTEM WITH AUTOMATIC DOOR LOCKING/UNLOCKING FUNCTION

FIELD OF THE INVENTION

The present invention relates generally to a car security alarm system which, in activated condition, generates an alarm signal when the car is broken in or unlocked without de-activating the system first for preventing un-authorized use of the car and in particular to a car security alarm system which automatically locks the car door when the car driver gets out of the car with the car key removed and/or automatically unlocks the car door when the car driver approaches the car so that the car driver need not lock/unlock the car door by himself or herself.

BACKGROUND OF THE INVENTION

Automobiles, especially passenger cars, are often provided with a security alarm system which, when not properly de-activated, generates an alarm signal when the car door is opened by an un-authorized person in an un-authorized manner. Besides the function of activation/deactivation of the system, most of the car security alarm systems have additional functions, such as car searching which flashes the car lights so that the car driver may easily locate the car, especially in a dark environment. To provide a communication between the car driver and the car, the car security alarm system comprises a transmitter portion which is usually made portable or hand-holdable so as to be carried and operated by the car driver when the car driver is out of the car and a receiver portion which is incorporated in the car electrical system and powered thereby. The receiver portion is in electrical connection with the car lights for selectively turning on the car lights to flash and mechanically coupled to the car door locking mechanism for locking/unlocking the car door upon receiving instruction from the transmitter portion.

The transmitter is usually provided with several push buttons respectively associated with different functions, such as alarm system activation/de-activation and car searching. In operation, the car driver has to actuate the desired one of the push buttons to activate the desired function of the car security alarm system. In actuating the push button, the transmitter portion which comprises a circuit therein emits a signal associated with the selected function to the receiver portion which, upon receiving and identifying the signal, activates the associated function. This, although providing an effective communication between the car and car driver, yet- is to some extent inconvenient. For example, when the car driver approaches the car and wishes to de-activate the security alarm system and thus unlock the car door, the car driver has to pick up the transmitter and push the button associated with the system deactivation function. The conventional system is not capable of identifying the approach of the car driver and will not automatically unlock the car door.

In addition, some of the car drivers who may be very absent-minded, may forget to activate the car security alarm or even forget to lock the car door when he or she gets out and leaves the car. This exposes the car to the danger of un-authorized use or break-in.

Thus, it particularly needs to improve the car security alarm system to incorporate the function of automatically locking/unlocking car door when the car driver leaves/approaches the car so as to overcome the drawbacks of the conventional system.

SUMMARY OF THE INVENTION

Therefor, an object of the present invention is to provide a car security alarm system comprising a transmitter portion which is to be carried by the car driver and a receiver portion which is incorporated in the car electrical system, the receiver portion detecting a predetermined signal which is emitted from the transmitter at predetermined intervals so that once no such signal is detected after a predetermined period, the system automatically locks the car door and thus a better protection to the car is offered.

Another object of the present invention is to provide a car security alarm system comprising a transmitter portion which is to be carried by the car driver and a receiver portion which is incorporated in the car electrical system, the receiver portion detecting a predetermined signal from the transmitter portion at predetermined intervals so that once such a signal is detected which indicates the car driver is approaching the car, the system automatically unlocks the car door to allow easy access to the interior of the car to the car driver.

To achieve the above objects, there is provided a car security alarm system comprising a receiver portion which is incorporated in a car electrical system and in electrical/mechanical connection with associated parts/systems of the car and a transmitter portion to be carried by a driver of the car. The transmitter portion repeatedly emits a predetermined signal comprising an identification code at predetermined intervals. The receiver portion comprises a receiving circuit to receive the signal and an identifying circuit to determine if the identification code is correct and apply a confirmation signal to a central processing unit in case the identification code is correct and the central processing unit generates an instruction to unlock the car door in the situation that the car security alarm system is in an activated condition. When the system is in a de-activated condition, and if no such identification signal is detected by the receiver portion within a predetermined period, then the central processing unit generates an instruction to lock the car door so as to provide a better protection to the car.

To further understand the present invention, reference is made to the following detailed description of preferred embodiments thereof, as well as the attached drawings, wherein:

BRIEF DESCRIPTION OF THE PREFERRED EMBODIMENT

FIG. 1 is a circuit diagram of the transmitter portion of the car security alarm system in accordance with the present invention; and FIG. 2 is a circuit diagram, in block form, of the receiver portion of the car security alarm system in accordance with the present invention.

DETAILED DESCRIPTION OF THE PREFERRED EMBODIMENTS

Figure 1:
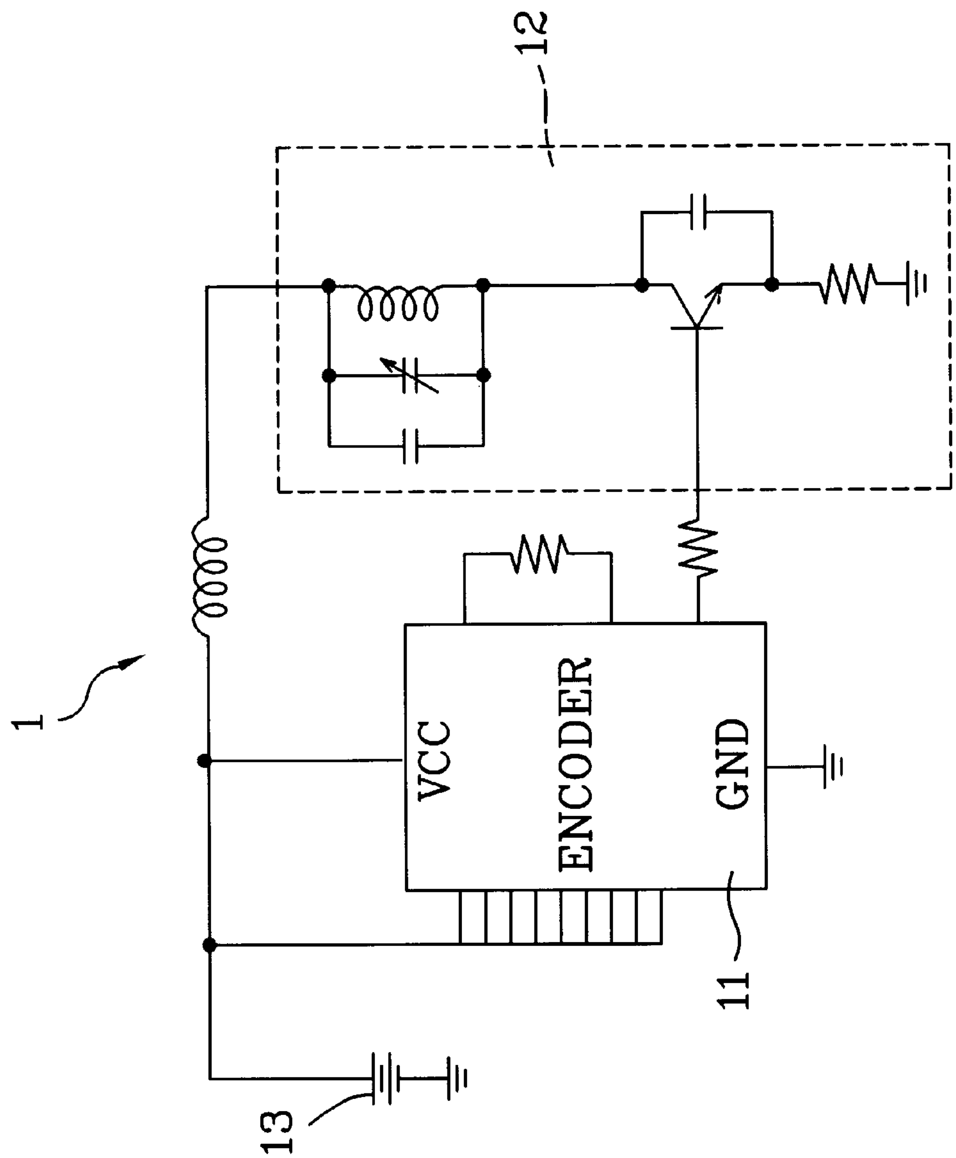

In accordance with the present invention, a car security alarm system is provided to be installed in a car for automatically locking the car door when the driver of the car gets out and leaves the car and/or automatically unlocks the car door when the car driver approaches the car to allow easy access to the interior of the car to the driver. The car security alarm system of the present invention comprises a transmitter portion which is particularly shown and generally designated with reference numeral 1 in FIG. 1 of the attached drawings and a receiver portion which is particularly shown and generally designated with reference numeral 2 in FIG. 2. It should be noted there is no car and the associated parts shown in the drawings for simplicity.

Referring to FIG. 1 first, which shows the transmitter portion of the car security alarm system in accordance with the present invention, the transmitter portion 1 comprises an encoder circuit 11 and a transmitting circuit 12 powered by a battery set 13. The transmitting circuit 12 comprises an LC oscillator circuit which is a well known circuit and a transistor and the related electronic devices/elements. The transmitter portion 1 emits a predetermined signal which is generated by being encoded by the encoder circuit 11. The predetermined encoded signal emitted from the transmitter portion 1 comprises at least a series of pulses and an identification code. The purpose of the pulses may provide any desired function or data communication between the transmitter 1 and the receiver 2 and is not the concern of the present invention.

To maintain a continuous communication between the transmitter portion 1 and the receiver portion 2, the transmitter portion 1 repeatedly emits the encoded signal. However, to reduce power consumption, the emission of the predetermined signal is performed at predetermined intervals, such as every one second. This elongates the service life of the battery set 13 that powers the transmitter portion 1.

Figure 2:
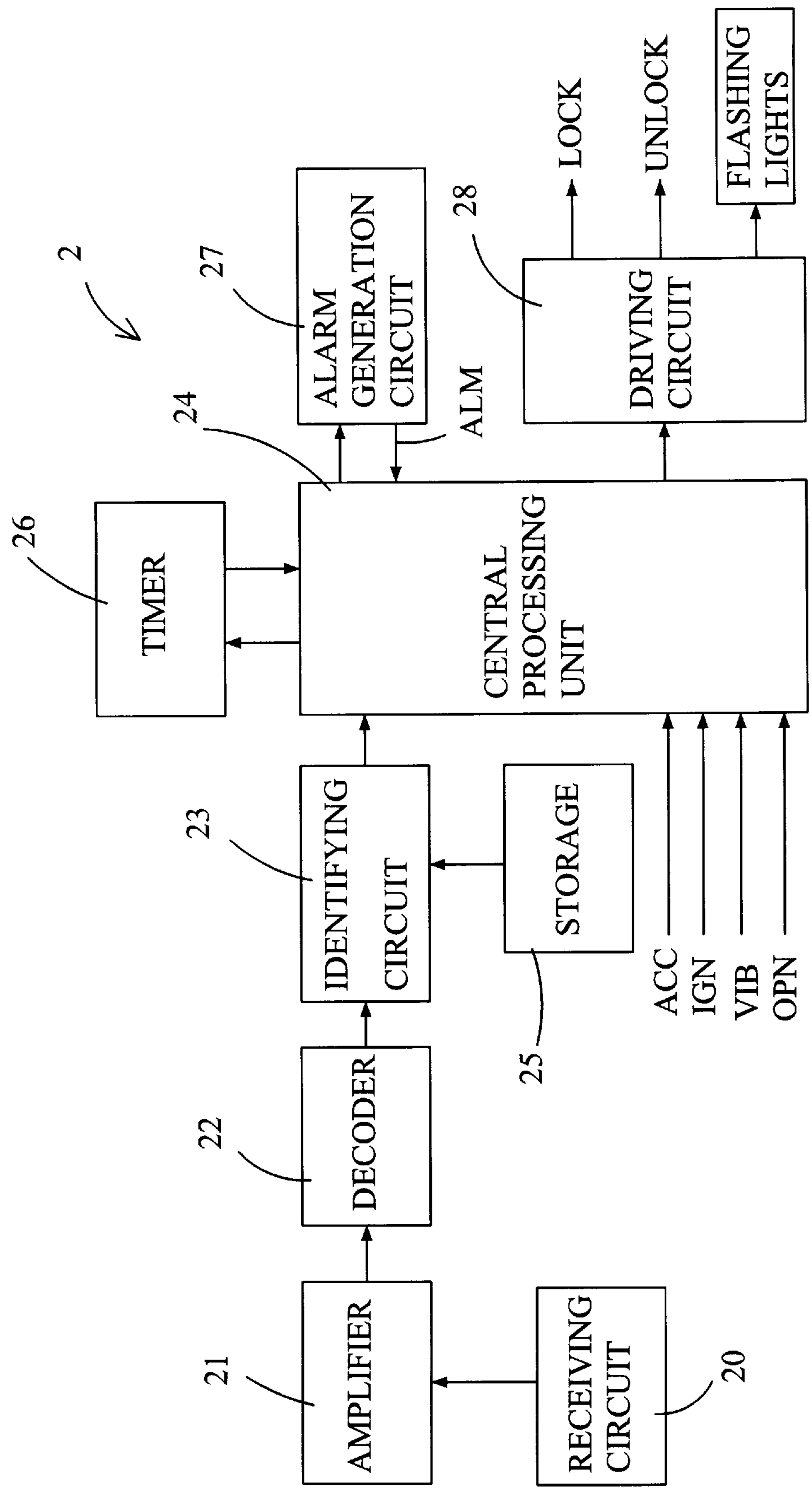

Referring now to FIG. 2 which shows the receiver portion 2 of the car security alarm system of the present invention, the receiver portion 2 comprises a receiving circuit 20, an amplifier circuit 21, a decoder circuit 22, an identifying circuit 23, a central processing unit 24, storage means, such as electronic memory 25, an alarm generation circuit 27 and a driving circuit 28. The receiver portion 2 of the car security alarm system of the present invention may optionally comprise a timer circuit 26 which is preferably included in the preferred embodiment of the present invention.

The receiving circuit 20 detects and receives the predetermined encoded signal from the transmitter portion 1, including both the series of pulses and the identification code. The received signal is then amplified by the amplifier 21 and decoded by the decoder 22. The decoded signal is processed by the identifying circuit 23 to check the identification code transmitted with the encoded signal emitted from the transmitter portion 1 which is done by comparing the identification code of the received signal with data stored in the storage means to see if they match each other. If the identification code is confirmed by the identifying circuit 23, then a confirmation signal is generated and applied to the central processing unit 24 by the identifying circuit 23. The central processing unit 24 then provides instructions to the driving circuit 28 to have the car door locked and/or unlocked.

There may be more than one set of data corresponding to different identification codes stored in the storage means. This allows different identification codes to de-activate the system.

The driving circuit 28 is coupled to the car electrical system to which the car door locking system is connected so as to perform the instructed job given by a driving signal from the central processing unit 24, such as locking/unlocking the car door and turning on the lights of the car. Thus, the central processing unit 24 may be capable of controlling of the functions of the car, including locking/unlocking car door via the driving circuit 28.

Furthermore, the central processing unit 24 is also connected to the alarm generation circuit 27 which is controlled by a control signal from the central processing unit 24 to generate an alarm signal once the central processing unit 24 detects an un-authorized use of the car, such as opening the car door without de-activating the car security alarm system first. In addition, the alarm generation circuit 27 also provides an ALM signal to the central processing unit 24 to indicate the activation (ALM in high state) or de-activation (ALM in low state) of the alarm.

The central processing unit 24 is also in connection with the timer 26 to start and/or stop the timer 26. The timer 26 is optional, but is preferred.

The central processing unit 24 also receives signals ACC (indicating status of the car electrical system) and IGN (indicating engine operation status) from the ignition switch of the car and an OPN signal from a door-closed detection sensor (not shown) which detects if the car door is closed and a VIB signal from a vibration sensor (not shown) which indicates shock or vibration of the car body due to for example unauthorized break-in of the car.

In operation, when the receiving circuit 20 of the receiver portion 2 receives the encoded signal emitted from the transmitter portion 1, the encoded signal is sent to the amplifier 21 to be amplified thereby and the amplified signal is decoded by the decoder 22. The decoded signal is transferred to the identifying circuit 23 to be compared with the data stored in the storage means 25. If the comparison is confirmed, then the central processing unit 24 performs either of the following operations:

(1) In case that the car security alarm system is in de-activated condition (wherein the ALM signal is in LOW state) and the engine is stopped (wherein the ACC and IGN signals are both in LOW state), if the receiver portion 2 of the car security alarm system receives the encoded signal from the transmitter portion 1 which indicates the car driver is nearby the car, then in accordance with a preferred embodiment of the present invention, the central processing unit 24 of the receiver portion 2 starts the timer 26. Once the receiver portion 2 detects no encoded signal from the transmitter portion 1, indicating the driver moves far away from the car, and the timer 26 exceeds a pre-set time period, then the central processing unit 24 of the receiver portion 2 activates the car security alarm system (signal ALM becoming HIGH) and locks the car door via the driving circuit 28. In the activated condition, if the central processing unit 24 detects a HIGH state in any one of the ACC, IGN, VIB and OPN signals which indicates an un-authorized use or break in of the car, then the alarm generation circuit 27 is initiated to give off the alarm signal which may comprise loud sound and/or flashing the car lights. If the car driver opens the car door (the OPN signal becoming HIGH) and then inserts the car key to initiate the car electrical system (the signal ACC becoming HIGH) or to start the engine (the IGN signal becoming HIGH), the timer 26 is reset and the system shut down.

(2) In case that the car security alarm system is in the activated condition, namely the car is not in used with engine stopped and the car door is locked (wherein the ACC and IGN signals are LOW and the ALM signal is HIGH and the OPN signal is HIGH), when the car driver who carries the transmitter portion 1 that repeatedly gives off the encoded signal approaches the car to a predetermined distance from the car, the receiver portion 1 detects and receives the encoded signal and with the identification code confirmed by the data stored in the storage means 25, the central processing unit 24 unlocks the car door via the driving circuit 28, de-activates the car security alarm system and starts the timer 26 to perform timing operation. The operation will then follows what was described above in point (1).

Alternatively, in accordance with another embodiment of the present invention, the timer 26 may be omitted and the system may completely relies on if the encoded signal is detected and received to activate/de-activate the car security alarm system of the present invention.

In a further embodiment of the present invention, the car security alarm of the present invention may be set to operate in such a way that in the situation that the receiver portion 2 receives the encoded signal from the transmitter portion 1, once the timer 26 exceeds a predetermined time period, the central processing unit 24 of the receiver portion 2 automatically secures the car door and such a situation may be released by the actuation of a manual release button incorporated in the transmitter portion 1. This help preventing the situation that the transmitter portion 1 is accidentally left behind by the car driver in a position nearby the car.

Although the preferred embodiments of the present invention have been described to illustrate the present invention, it is apparent that changes and modifications in the specifically described embodiment can be carried out without departing from the scope of the invention which is intended to be limited only by the appended claims.

What is claimed is:

1. A car security alarm system comprising:

a transmitter portion to be carried by a car driver, the transmitter portion comprising a signal generation circuit which generates an encoded signal comprising an identification code and a transmitting circuit which automatically and repeatedly emits the encoded signal at predetermined intervals; and a receiver portion adapted to be incorporated in a car having a door and an electrical system, the receiver portion comprising:

a receiving circuit for receiving the encoded signal from the transmitter portion;

an amplifier circuit connected to the receiving circuit for amplifying the signal received by the receiving circuit;

a decoder circuit connected to the amplifier circuit for decoding the signal received by the receiving circuit and amplified by the amplifier circuit to obtain the identification code carried by the received signal;

storage means storing therein at least one set of data for confirming the identification code carried by the received signal;

an identifying circuit which receives the decoded signal from the decoder circuit and accesses the data stored in the storage means to confirm the identification code of the received signal and generates a confirmation signal;

a central processing unit which receives the confirmation signal from the identification circuit to provide a driving signal and a control signal;

a driving circuit which is coupled to the car electrical system, the driving circuit receiving the driving signal from the central processing unit to lock/unlock the car door; and an alarm generation circuit which is coupled to the central processing unit to receive the control signal therefrom for activating/de-activating the alarm generation circuit to generate an alarm signal, wherein when the car security alarm system is in an activated condition, the receiver portion, upon receiving the encoded signal from the transmitter portion deactivates the car security alarm system and unlocks the car door, and when the car security alarm system is in de-activated condition, the receiver portion, upon detecting no such encoded signal from the transmitter portion, activates the car security alarm system and locks the car door.

2. The car security alarm system as claimed in claim 1, wherein the storage means has a plurality of sets of data stored therein to confirm the identification code of the received signal.

3. The car security alarm system as claimed in claim 1, wherein the receiver portion further comprises a timer circuit for setting a predetermined time period for activating the car security alarm system.

* * * * *